US011494038B2

(12) United States Patent
Chang et al.

(10) Patent No.: US 11,494,038 B2
(45) Date of Patent: Nov. 8, 2022

(54) TOUCH PANEL

(71) Applicant: HIMAX TECHNOLOGIES LIMITED, Tainan (TW)

(72) Inventors: Yaw-Guang Chang, Tainan (TW); Hui-Min Wang, Tainan (TW); Cheng-Hung Tsai, Tainan (TW); Chung-Wen Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 303 days.

(21) Appl. No.: 17/026,296

(22) Filed: Sep. 20, 2020

(65) Prior Publication Data

US 2021/0240288 A1 Aug. 5, 2021

Related U.S. Application Data

(60) Provisional application No. 62/970,716, filed on Feb. 6, 2020, provisional application No. 62/970,187, filed on Feb. 5, 2020.

(51) Int. Cl.
| | |
|---|---|
| *G06F 3/044* | (2006.01) |
| *G02F 1/03* | (2006.01) |
| *G06F 3/041* | (2006.01) |

(52) U.S. Cl.
CPC ............ *G06F 3/044* (2013.01); *G02F 1/0311* (2013.01); *G06F 3/0412* (2013.01); *G06F 3/0446* (2019.05); *G06F 3/0448* (2019.05)

(58) Field of Classification Search
CPC ...... G02F 1/0311; G06F 3/0412; G06F 3/044; G06F 3/0446; G06F 3/0448
See application file for complete search history.

(56) References Cited

U.S. PATENT DOCUMENTS

| | | | |
|---|---|---|---|
| 8,766,938 B2* | 7/2014 | Lee ...................... | G06F 3/044 |
| | | | 345/173 |
| 9,377,883 B2* | 6/2016 | Lee ...................... | G06F 3/041 |
| 9,563,319 B2* | 2/2017 | Vandermeijden ....... | G06F 3/044 |
| 9,983,731 B2* | 5/2018 | Gao .................... | G06F 3/04186 |
| 2012/0182235 A1* | 7/2012 | Lee .................... | G06F 3/04182 |
| | | | 345/173 |
| 2013/0063370 A1* | 3/2013 | Lee .................... | G06F 3/04186 |
| | | | 345/173 |
| 2015/0242052 A1* | 8/2015 | Gao .................... | G06F 3/0446 |
| | | | 345/178 |
| 2016/0179241 A1* | 6/2016 | Vandermeijden ....... | G06F 3/044 |
| | | | 345/174 |

* cited by examiner

*Primary Examiner* — Michael Pervan
(74) *Attorney, Agent, or Firm* — CKC & Partners Co., LLC

(57) ABSTRACT

A touch panel includes a cover lens located at top of the touch panel, plural touch sensor units, and plural sensing channels. The touch sensor units are disposed below the cover lens and arranged in rows and columns. The touch sensor units are disposed on the sensing channels. Each of touch sensor units acquires a sensing magnitude for identifying a position of the cover lens that touched by the stylus according to signals outputted by the sensing channels. The sensing magnitude of one of the touch sensor units is composed of the signals of the adjacent sensing channels located within a vertical projection of the one of the touch sensor units.

10 Claims, 4 Drawing Sheets

(3 of 4 Drawing Sheet(s) Filed in Color)

TOUCH PANEL

RELATED APPLICATIONS

This application claims priority to U.S. Provisional Application Ser. No. 62/970,187, filed Feb. 5, 2020, and U.S. Provisional Application Ser. No. 62/970,716, filed Feb. 6, 2020, the disclosures of which are incorporated herein by reference in their entireties.

BACKGROUND

Field of Invention

The present invention relates to a touch panel. More particularly, the present invention relates to a touch panel for improving touch sensitivity.

Description of Related Art

The tip size of a general stylus is much smaller than the sensor pitch of a capacitive sensing touch panel. In order to increase the touch sensitivity that the stylus touches the capacitive sensing touch panel, the capacitive sensing touch panel may reduce the sensor pitch to improve the touch sensing resolution. However, the disadvantage of reducing the sensor pitch is that more sensing channels are required, thereby increasing the cost for manufacturing the capacitive sensing touch panel.

SUMMARY

The present invention provides a touch panel. The touch panel includes a cover lens located at top of the touch panel, plural touch sensor units, and plural sensing channels. The touch sensor units are disposed below the cover lens and arranged in rows and columns. The touch sensor units are disposed on the sensing channels. Each of touch sensor units acquires a sensing magnitude for identifying a position of the cover lens that touched by the stylus according to signals outputted by the sensing channels. The sensing magnitude of one of the touch sensor units is composed of the signals of the adjacent sensing channels located within a vertical projection of the one of the touch sensor units.

In accordance with one or more embodiments of the invention, the number of the touch sensor units is same as the number of the sensing channels.

In accordance with one or more embodiments of the invention, the touch panel is an in-cell touch panel, and the touch sensor units are disposed on a VCOM layer of the touch panel.

In accordance with one or more embodiments of the invention, the touch panel is an out-cell touch panel, an out-cell touch OLED panel, a flexible OLED touch panel, or a Y-OCTA (Youm On-Cell Touch AMOLED) panel, and the touch sensor units are disposed between the cover lens and a polarizer layer of the touch panel.

In accordance with one or more embodiments of the invention, the touch panel further includes a sensing circuitry and plural parallel traces coupled with the sensing circuitry. Each of the parallel traces is coupled to one of the sensing channels. The sensing circuitry receives the signals of the sensing channels through the parallel traces, thereby identifying the position of the cover lens that touched by the stylus.

In accordance with one or more embodiments of the invention, the touch panel further includes plural pixels. Each of the sensing channels corresponds to some of the pixels that are complete pixels.

In accordance with one or more embodiments of the invention, the sensing magnitude of the one of the touch sensor units is composed of the signals of at least three of the sensing channels.

In accordance with one or more embodiments of the invention, the sensing magnitude of the one of the touch sensor units is composed of the signals of five of the sensing channels.

In accordance with one or more embodiments of the invention, a pattern of each of the sensing channels is a serrated jigsaw puzzle.

In accordance with one or more embodiments of the invention, a pattern of each of the sensing channels is a brush bar.

BRIEF DESCRIPTION OF THE DRAWINGS

The patent or application file contains at least one drawing executed in color. Copies of this patent or patent application publication with color drawing(s) will be provided by Office upon request and payment of the necessary fee. The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
FIG. 1 illustrates a cross-sectional view of a touch panel according to some embodiments of the present invention.

FIG. 1 illustrates a cross-sectional view of a touch panel 100 according to some embodiments of the present invention. The touch panel 100 includes a cover lens 110, an optically clear adhesive (OCA) layer 120, a polarizer layer 130, a color filter layer CF, a liquid crystal layer 140, a thin film transistor (TFT) layer 150, and a backlight layer 160 vertically and sequentially arranged from top to bottom.

The touch panel 100 has a sensing layer located below the cover lens 110, the sensing layer is used for sensing a touch behavior that a stylus (such as an active pen or a passive pen) touches on the cover lens 110. In some embodiments of the present invention, the touch panel 100 may be a capacitive touch panel, such as an in-cell touch panel, an out-cell touch panel, an on-cell touch panel, an out-cell touch OLED (organic light-emitting diode) panel, a flexible OLED touch panel, or a Y-OCTA (Youm On-Cell Touch AMOLED) panel. When the touch panel 100 is the in-cell touch panel, the sensing layer is disposed on a common electrode (VCOM) layer located within the liquid crystal layer 140. When the touch panel 100 is the out-cell touch panel, the sensing layer is disposed between the cover lens 110 and the polarizer layer 130 of the touch panel 100.

The sensing layer of the touch panel 100 includes plural touch sensor units horizontally arranged in rows and columns. The sensing layer further includes plural sensing channels that the touch sensor units are disposed thereon. In some embodiments of the present invention, each of touch sensor units acquires a sensing magnitude for identifying a position of the cover lens that touched by the stylus according to signals outputted by the sensing channels. In some embodiments of the present invention, the number of the touch sensor units is same as the number of the sensing channels.

Figure 2:
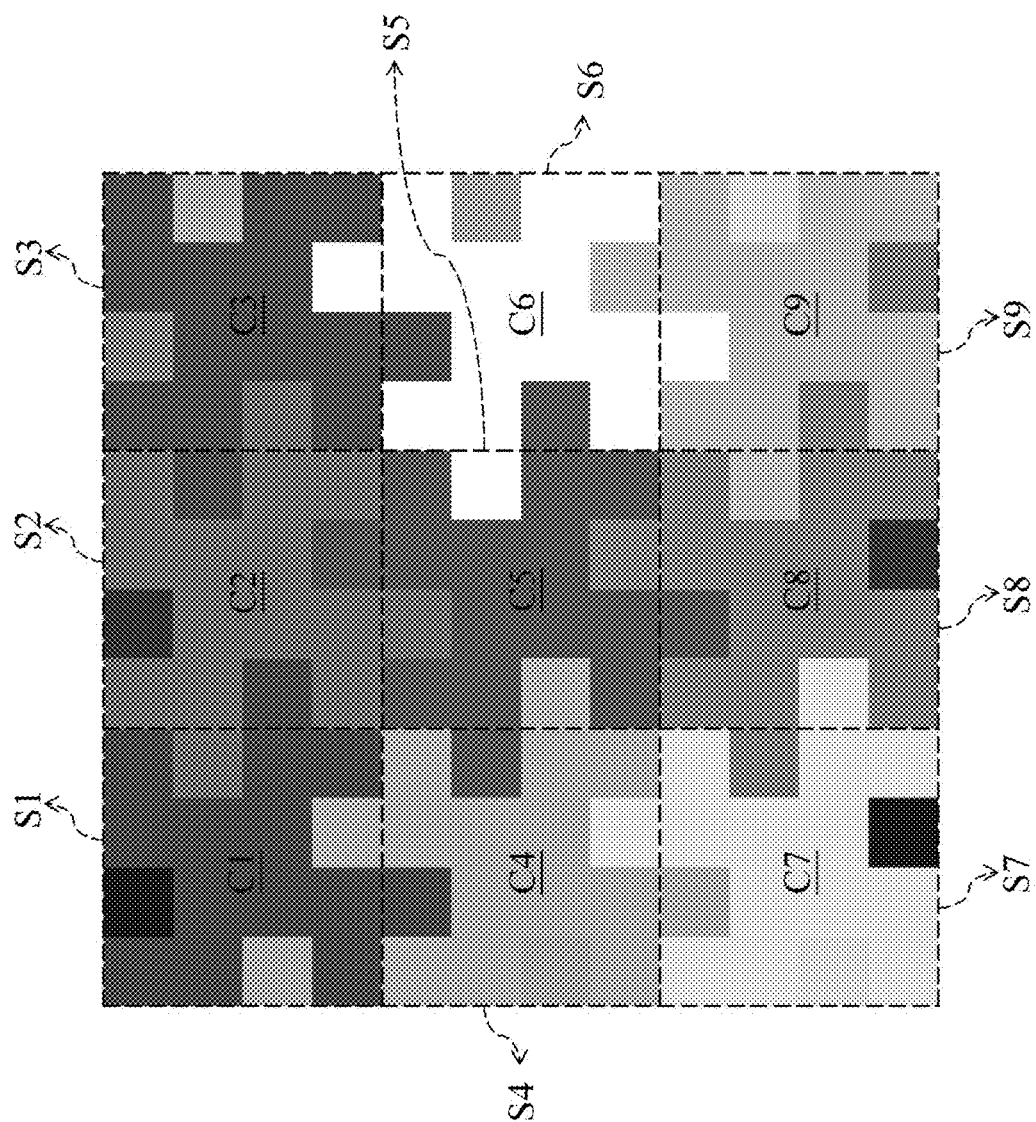
FIG. 2 illustrates a top perspective diagram of the touch sensor units and the sensing channels according to a first embodiment of the present invention.

FIG. 2 illustrates a top perspective diagram of the touch sensor units S1~S9 and the sensing channels C1~C9 according to a first embodiment of the present invention. As shown in FIG. 2, the touch sensor units S1-S9 are framed by the dash lines and arranged in three rows and three columns. As shown in FIG. 2, the sensing channels C1~C9 are represented by different colors. As shown in FIG. 2, the number of the touch sensor units S1-S9 is nine and the number of the sensing channels C1~C9 is nine, however, the present invention is not limited thereto.

As shown in FIG. 2, a pattern of each of the touch sensor units S1-S9 is different from a pattern of each of the sensing channels C1~C9, and a pattern of each of the sensing channels C1~C9 is designed as a serrated jigsaw puzzle. In some embodiments of the present invention, a vertical projection of each of the touch sensor units includes at least three of the adjacent sensing channels, and thus the sensing magnitude of one of the touch sensor units is composed of the signals of the adjacent sensing channels located within a vertical projection of the one of the touch sensor units, thereby improving touch sensitivity of the touch panel 100. For example, as shown in FIG. 2, a vertical projection of the touch sensor unit S5 includes five sensing channels C2, C4~C6, and C8. In addition, it should be understood that a vertical projection of the touch sensor unit located at the planar corner of the sensing layer includes three adjacent sensing channels, and a vertical projection of the touch sensor unit located at the planar edge of the sensing layer includes four adjacent sensing channels.

Figure 3:
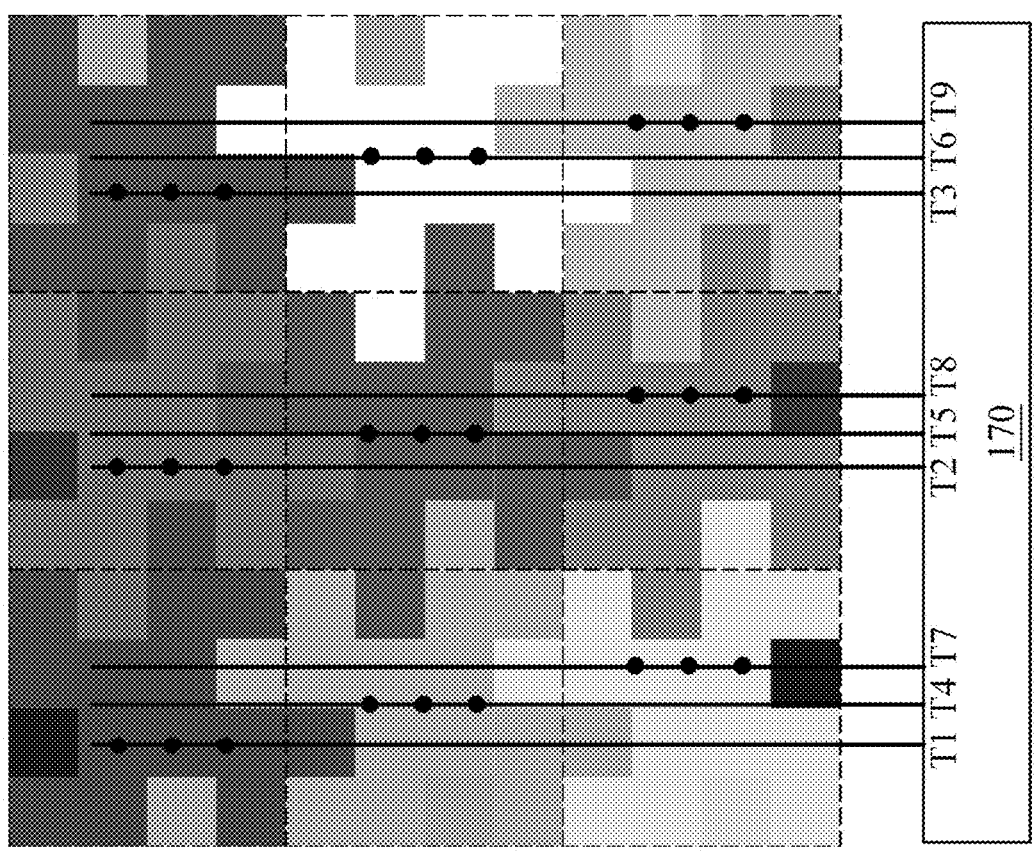
FIG. 3 illustrates a circuit diagram of the touch sensor units and the sensing channels according to the first embodiment of the present invention.

FIG. 3 illustrates a circuit diagram of the touch sensor units S1-59 and the sensing channels C1~C9 according to the first embodiment of the present invention. The touch panel 100 further includes a sensing circuitry 170. The sensing layer further includes plural parallel traces T1~T9 coupled with the sensing circuitry 170. The parallel traces T1~T9 are respectively coupled to the sensing channel C1~C9 through the via holes (shown as the black round dots in FIG. 3). In other words, the number of the parallel traces is same as the number of the sensing channels, and thus the number of the parallel traces is same as the number of the touch sensor units. In some embodiments of the present invention, the sensing circuitry receives the signals of the sensing channels through the parallel traces, thereby identifying the position of the cover lens 110 that touched by the stylus.

The TFT layer 150 of the touch panel 100 includes plural pixels horizontally arranged in rows and columns. In some embodiments of the present invention, each of the sensing channels corresponds to some of the pixels that are complete pixels. In other words, a vertical projection of each of the sensing channels includes plural complete pixels, and thus the incomplete pixel combinations are prohibited in the vertical projection of each of the sensing channels.

Figure 4:
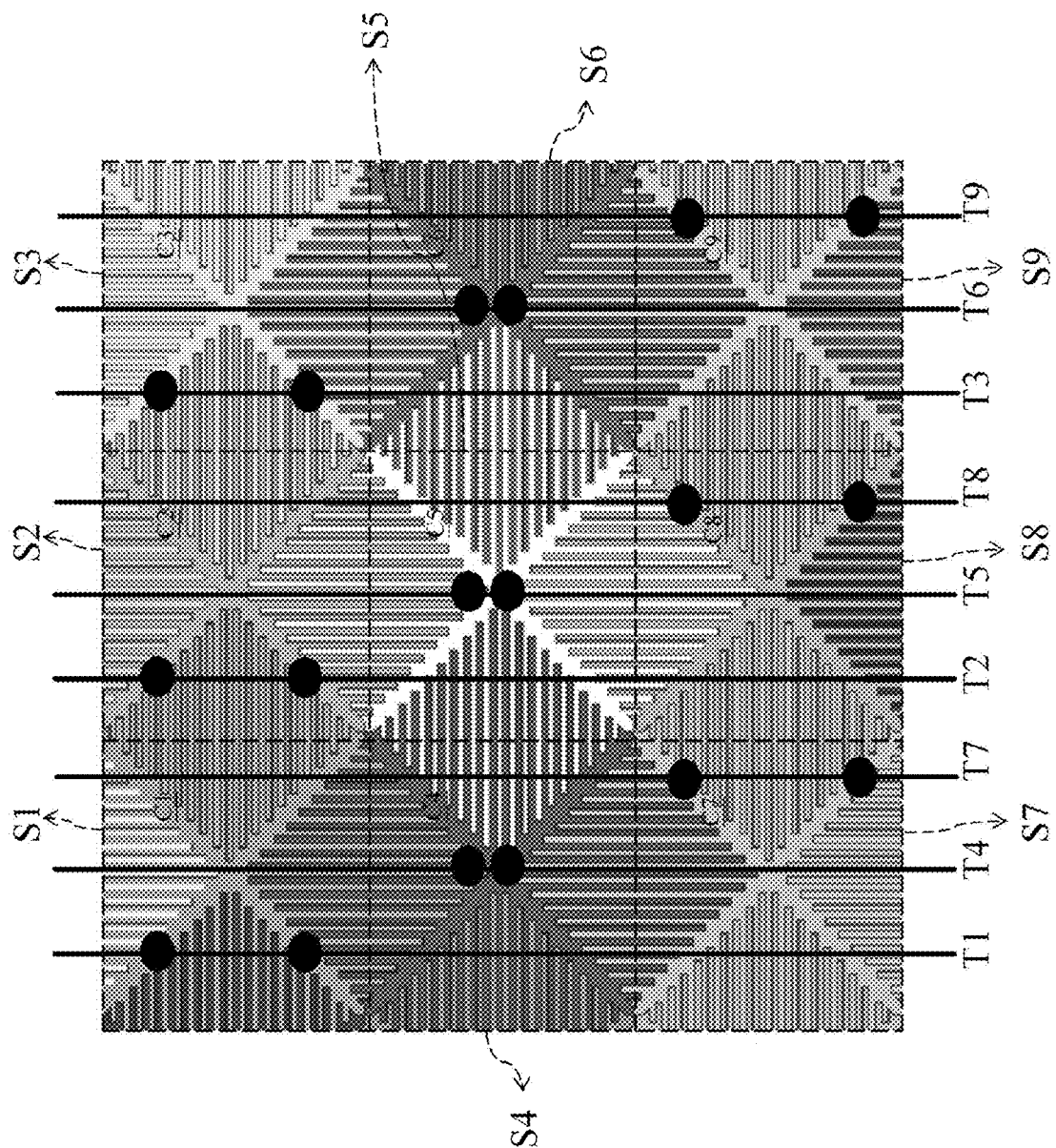
FIG. 4 illustrates a top perspective diagram of the touch sensor units and the sensing channels according to a second embodiment of the present invention.

FIG. 4 illustrates a top perspective diagram of the touch sensor units S1~S9 and the sensing channels C1~C9 according to a second embodiment of the present invention. As shown in FIG. 4, the touch sensor units S1~S9 are framed by the dash lines and arranged in three rows and three columns. As shown in FIG. 4, the sensing channels C1~C9 are represented by different colors.

As shown in FIG. 4, a pattern of each of the touch sensor units S1~S9 is different from a pattern of each of the sensing channels C1~C9, and a pattern of each of the sensing channels C1~C9 is designed as a brush bar. In some embodiments of the present invention, a vertical projection of each of the touch sensor units includes at least three of the adjacent sensing channels, and thus the sensing magnitude of one of the touch sensor units is composed of the signals of the adjacent sensing channels located within a vertical projection of the one of the touch sensor units, thereby improving touch sensitivity of the touch panel 100.

As shown in FIG. 4, the sensing layer further includes plural parallel traces T1~T9 respectively coupled to the sensing channel C1~C9 through the via holes (shown as the black round dots in FIG. 4).

It is worth mentioning that the patterns of the sensing channels shown in FIG. 2 and FIG. 4 are uniform or symmetric with each other, however, the present invention is not limited thereto, the patterns of the sensing channels may be non-uniform or non-symmetric.

From the above description, the present invention provides a touch panel 100 for improving touch sensitivity and touch sensing resolution. In other words, the present invention increases the sensitivity of signal changes around the position that the stylus touches on the cover lens of the touch panel, thereby helping the judgment of coordinate algorithm. In addition, the present invention reduces the number of the sensing channel coupled to the sensing circuitry and saves channel fan-out area between the sensing circuitry and the sensing layer. Furthermore, the present invention does not need to increase the number of the sensing channels, thereby saving the cost for manufacturing the touch panel.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
a cover lens located at top of the touch panel;
a plurality of touch sensor units disposed below the cover lens and arranged in rows and columns; and
a plurality of sensing channels, wherein the touch sensor units are disposed on the sensing channels;
wherein each of touch sensor units acquires a sensing magnitude for identifying a position of the cover lens that touched by the stylus according to signals outputted by the sensing channels;

wherein the sensing magnitude of one of the touch sensor units is composed of the signals of the adjacent sensing channels located within a vertical projection of the one of the touch sensor units.

2. The touch panel of claim 1, wherein the number of the touch sensor units is same as the number of the sensing channels.

3. The touch panel of claim 1, wherein the touch panel is an in-cell touch panel, and the touch sensor units are disposed on a VCOM layer of the touch panel.

4. The touch panel of claim 1, wherein the touch panel is an out-cell touch panel, an out-cell touch OLED panel, a flexible OLED touch panel, or a Y-OCTA (Youm On-Cell Touch AMOLED) panel, wherein the touch sensor units are disposed between the cover lens and a polarizer layer of the touch panel.

5. The touch panel of claim 1, further comprising:
a sensing circuitry; and
a plurality of parallel traces coupled with the sensing circuitry;

wherein each of the parallel traces is coupled to one of the sensing channels;
wherein the sensing circuitry receives the signals of the sensing channels through the parallel traces, thereby identifying the position of the cover lens that touched by the stylus.

6. The touch panel of claim 1, further comprising:
a plurality of pixels;
wherein each of the sensing channels corresponds to some of the pixels that are complete pixels.

7. The touch panel of claim 1, wherein the sensing magnitude of the one of the touch sensor units is composed of the signals of at least three of the sensing channels.

8. The touch panel of claim 1, wherein the sensing magnitude of the one of the touch sensor units is composed of the signals of five of the sensing channels.

9. The touch panel of claim 1, wherein a pattern of each of the sensing channels is a serrated jigsaw puzzle.

10. The touch panel of claim 1, wherein a pattern of each of the sensing channels is a brush bar.

* * * * *